United States Patent
Sun

(10) Patent No.: US 9,268,174 B2
(45) Date of Patent: Feb. 23, 2016

(54) RUBBING DEVICE AND RUBBING METHOD

(71) Applicant: Shenzhen China Star Optoelectronics Technology Co., Ltd., Shenzhen, Guangdong (CN)

(72) Inventor: Shihying Sun, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 185 days.

(21) Appl. No.: 14/235,423

(22) PCT Filed: Dec. 31, 2013

(86) PCT No.: PCT/CN2013/091219
§ 371 (c)(1),
(2) Date: Jan. 27, 2014

(87) PCT Pub. No.: WO2015/027657
PCT Pub. Date: Mar. 5, 2015

(65) Prior Publication Data
US 2015/0065015 A1    Mar. 5, 2015

(30) Foreign Application Priority Data

Sep. 2, 2013  (CN) .......................... 2013 1 0392750

(51) Int. Cl.
*G02F 1/1337* (2006.01)
*B24B 27/00* (2006.01)
(Continued)

(52) U.S. Cl.
CPC ............ *G02F 1/133784* (2013.01); *B24B 1/00* (2013.01); *B24B 7/07* (2013.01);
(Continued)

(58) Field of Classification Search
CPC ... G02F 1/133784; G02F 1/1337; B24B 7/07; B24B 7/228; B24B 9/065; B24B 41/068; B24B 55/06; B24B 27/0076
See application file for complete search history.

(56) References Cited

U.S. PATENT DOCUMENTS 5,879,497 A * 3/1999 Nakahara .......... G02F 1/133784
156/295
7,435,302 B2* 10/2008 Takahara .................. B08B 1/04
134/15

(Continued)

FOREIGN PATENT DOCUMENTS

| CN | 1584711 A | 2/2005 |
|----|-----------|--------|
| CN | 101364008 A | 2/2009 |
| CN | 102087442 A | 6/2011 |
| CN | 203133445 U | 8/2013 |
| CN | 103424935 A | 12/2013 |
| JP | 2003066456 A | 3/2003 |

*Primary Examiner* — Timothy V Eley
(74) *Attorney, Agent, or Firm* — Andrew C. Cheng

(57) ABSTRACT

The present invention relates to a rubbing device and a rubbing method. The rubbing device includes: a substrate carrier, an aligning roller having a surface that is rubbing fabric, a driving mechanism that drives the substrate carrier and the substrate that is to be subjected to alignment treatment carried thereby to undergo a translational movement, and an elevation arm. The lower surface of the aligning roller is made suitable to contact and rub the upper surface of the substrate that is to be subjected to alignment treatment and side edges of the upper surface of the substrate that is to be subjected to alignment treatment are made suitable to scrape the lower surface of the aligning roller. The substrate carrier is provided in a top thereof with channels corresponding to two opposite side edges of the substrate that is to be subjected to alignment treatment in the translational movement direction. The channels are arranged to be suitable to have the two side edges of the substrate that is to be subjected to alignment treatment respectively suspending in the channels. The present invention also provides a rubbing method. The rubbing device and the rubbing method of the present invention use a substrate that is to be subjected to alignment treatment to scrape PI chips from the aligning roller into channels so as to prevent the PI chips from moving with the aligning roller to spread over an AA zone of the substrate that is to be subjected to alignment treatment, thereby improving the defects of bright spots and mura generated in a rubbing process.

14 Claims, 3 Drawing Sheets

(51) Int. Cl.
　　*B24B 1/00*　　　　(2006.01)
　　*B24B 41/06*　　　(2012.01)
　　*B24B 55/06*　　　(2006.01)
　　*B24B 7/07*　　　　(2006.01)
　　*B24B 7/22*　　　　(2006.01)
　　*B24B 9/06*　　　　(2006.01)
(52) U.S. Cl.
　　CPC ............... *B24B 7/228* (2013.01); *B24B 9/065* (2013.01); *B24B 27/0076* (2013.01); *B24B 41/068* (2013.01); *B24B 55/06* (2013.01); *G02F 1/1337* (2013.01)

(56) References Cited

U.S. PATENT DOCUMENTS

| 8,459,201 B2 * | 6/2013 | Hara ..................... G02F 1/1341 118/305 |
| 2006/0274245 A1 | 12/2006 | Cho |
| 2008/0239222 A1 * | 10/2008 | Naitoh ............. G02F 1/133784 349/123 |

* cited by examiner

RUBBING DEVICE AND RUBBING METHOD

BACKGROUND OF THE INVENTION

1. Field of the Invention

The present invention relates to the field of manufacturing technology of liquid crystal displays, and in particular to a rubbing device and a rubbing method.

2. The Related Arts

A rubbing process for alignment is an important step of a manufacturing process of a thin-film transistor liquid crystal display and is carried out before a boxing operation and is generally used in a twisted nematic (TN) mode, an in-plane switching (IPS) mode, and a fringe field switching (FFS) mode as an operation for alignment applied to a TFT (Thin-Film Transistor) array substrate or a CF (Color Filter) substrate that has already been coated with an aligning agent.

A rubbing process, specifically speaking, is a process of rubbing a surface of an alignment film in a fixed direction by using a soft rubbing fabric so as to form grooves that force liquid crystal to align in a predetermined direction. The rubbing process also generates a pre-tilt angle to ensure the liquid crystal to stand in the same direction. Thus, the rubbing process is a vital part of a manufacturing process of a liquid crystal display.

A rubbing device that is employed in the rubbing process is generally composed of a rubbing roller, a piece of fabric, an elevation arm, and a substrate carrier. The rubbing fabric is set in advance on a surface of the rubbing roller and the elevation arm controls a vertical distance between the rubbing roller and the substrate carrier. By adjusting the vertical distance, the rubbing fabric set on the rubbing roller can be put into contact with the substrate carried on the substrate carrier with a proper aligning pressure in order to carry out rubbing. Generally, parameters that affect the rubbing process include a moving speed of the substrate carrier, the radius of the aligning roller, a rotational speed of the aligning roller, times of aligning, and the aligning pressure, among which the rotational speed and the moving speed are process control parameters and the selection of the material of the rubbing fabric is closely related to the yield rate of the alignment-completed substrate. The material of the rubbing fabric is generally divided into cotton, artificial fiber (such as Rayon), and Nylon.

Heretofore, before the rubbing process is applied to an alignment film, the rubbing fabric is first attached to the surface of the rubbing roller. The rubbing roller with the rubbing fabric attached to the surface thereof is then subjected to pre-rubbing of the rubbing fabric on the surface of the rubbing roller in a rubbing device that comprises a pre-rubbing substrate placed therein so as to have fuzzes of the rubbing fabric aligning in the same direction for being used in the rubbing process to form grooves that aligns liquid crystal in a predetermined direction.

Rubbing is a vital link of the current manufacturing technology of LCD (Liquid Crystal Display). However, it is inevitable that rubbing will generate some tiny dust powders (namely PI (Polyimide) chips and flakes). Such dust powders may causes defects of fragmented bright spots and mura. Thus, it is a challenge for panel workshops to reduce the dust powder induced by the rubbing process.

Referring to FIG. 1, a schematic view is given to illustrate the principle of generating dust powders in a conventional rubbing process. A substrate carrier 11 undergoes translation in the direction indicated by the arrow. A substrate 12, which is to be subjected to alignment, is placed on the substrate carrier 11 to undergo the translation with the substrate carrier 11 in a direction toward a rubbing roller 13. The rubbing roller 13 comprises a piece of rubbing fabric 14 attached to a surface thereof. The rubbing fabric 14 rubs a surface of the substrate 12 and PI chips 15 are generated. Due to a height difference between the substrate carrier 11 and the substrate 12, the PI chips 15 on the rubbing roller 13 will get accumulated in the located circled by phantom lines in FIG. 1 and may have a great chance to be rebounded to the top of the substrate 12, leading to defects of fragmented bright spots and mura.

Referring to FIG. 2, photos of scanning electron microscopes are given to show various types of defect generated in a conventional rubbing process. A substrate carrier 21 and a substrate 22 placed thereon are moved in a direction indicated the arrow toward an aligning roller 23. The aligning roller 23 comprises a piece of rubbing fabric 24 attached to a surface thereof. After the rubbing process is completed, a portion 221 of the substrate 22 is subjected to photographing by means of a scanning electron microscope and various types of defect generated in the conventional rubbing process can be obtained and displayed, such as PI settling, irregular scratching, PI scratching, and ITO (Indium Tin Oxide) collapsing.

A process of generation of defects of fragmented bright spot and mura will be described with reference to FIG. 2: (1) When the rubbing roller 23 is rotated in a clockwise direction with respect to the translation direction of the substrate carrier 21 and the substrate 22, due to cliff effect, PI chips on the right side of the rubbing roller 23 will be carried by the rubbing fabric 24 to get accumulated at the left side; (2) due to slit effect, the carried PI chips will gather in slits of the rubbing fabric 24 and the substrate 22 or will be carried away later; (3) due to distance effect, the carried PI chips are moved backed to a different site on the substrate 22 without being subject to alignment; (4) PI chips that are left in the AA zone (an effective displaying zone) cause fragment bright spots; and (5) PI chips that are away from the rubbing roller 23 form mura.

SUMMARY OF THE INVENTION

Thus, an object of the present invention is to provide a rubbing device, which improves the defects of bright spots and mura caused in a rubbing process.

Another object of the present invention is to provide a rubbing method, which is improves the defects of bright spots and mura caused in a rubbing process.

To achieve the above objects, the present invention provides a rubbing device, which comprises: a substrate carrier for carrying a substrate that is to be subjected to alignment treatment, an aligning roller having a surface that is rubbing fabric, a driving mechanism that drives the substrate carrier and the substrate that is to be subjected to alignment treatment carried thereby to undergo a translational movement with respect to the aligning roller, and an elevation arm that adjusts a relative vertical distance between a lower surface of the aligning roller and an upper surface of the substrate that is to be subjected to alignment treatment. The relative vertical distance is arranged to have the lower surface of the aligning roller suitable to contact and rub the upper surface of the substrate that is to be subjected to alignment treatment and also to have side edges of the upper surface of the substrate that is to be subjected to alignment treatment suitable to scrape the lower surface of the aligning roller. The substrate carrier is provided in a top thereof with channels corresponding to the two opposite side edges of the substrate that is to be subjected to alignment treatment in the translational movement direction. The channels are arranged to be suitable to have the two side edges the substrate that is to be subjected to alignment treatment respectively suspending in the channels.

The substrate that is to be subjected to alignment treatment is used to scrape the PI chips from the aligning roller that rotates at a high speed into the channels, thereby making the PI chips accumulated in the channels and not rebounded to the top of the substrate that is to be subjected to alignment treatment so as to prevent the PI chips from moving with the aligning roller to spread over an AA zone of the substrate that is to be subjected to alignment treatment.

The rubbing device further comprises a first cleansing roller. The first cleansing roller is set behind the substrate carrier in the translational movement direction of the substrate carrier and arranged to move in unison with the substrate carrier for translation. The first cleansing roller has an upper surface having a height that is suitable to contact and rub the lower surface of the aligning roller. When the first cleansing roller is moved to a location under the aligning roller, the aligning roller and the first cleansing roller are allowed to rub each other so as to cleanse off the PI chips of the aligning roller.

The rubbing device further comprises a second cleansing roller. The second cleansing roller is arranged to contact and rub the first cleansing roller and movable in unison with the substrate carrier for translation so as to further cleanse the first cleansing roller.

The second cleansing roller is located exactly under the first cleansing roller.

The rubbing device further comprises a vacuum cleaner. The vacuum cleaner is arranged in the channels. The vacuum cleaner arranged in the channels can draw and move away the PI chips in order to prevent the PI chips from getting filled and spilling.

The relative vertical distance between the lower surface of the aligning roller and the upper surface of the substrate that is to be subjected to alignment treatment is 0.1 to 0.6 mm.

The relative vertical distance between the lower surface of the aligning roller and the upper surface of the substrate that is to be subjected to alignment treatment is 0.2 to 0.5 mm.

The present invention also provides a rubbing device, which comprises: a substrate carrier for carrying a substrate that is to be subjected to alignment treatment, an aligning roller having a surface that is rubbing fabric, a driving mechanism that drives the substrate carrier and the substrate that is to be subjected to alignment treatment carried thereby to undergo a translational movement with respect to the aligning roller, and an elevation arm that adjusts a relative vertical distance between a lower surface of the aligning roller and an upper surface of the substrate that is to be subjected to alignment treatment, the relative vertical distance being arranged to have the lower surface of the aligning roller suitable to contact and rub the upper surface of the substrate that is to be subjected to alignment treatment and also to have side edges of the upper surface of the substrate that is to be subjected to alignment treatment suitable to scrape the lower surface of the aligning roller, the substrate carrier being provided in a top thereof with channels corresponding to the two opposite side edges of the substrate that is to be subjected to alignment treatment in the translational movement direction, the channels being arranged to be suitable to have the two side edges the substrate that is to be subjected to alignment treatment respectively suspending in the channels;

further comprising a first cleansing roller, the first cleansing roller being set behind the substrate carrier in the translational movement direction of the substrate carrier and arranged to move in unison with the substrate carrier for translation, the first cleansing roller having an upper surface having a height that is suitable to contact and rub the lower surface of the aligning roller; and further comprising a second cleansing roller, the second cleansing roller being arranged to contact and rub the first cleansing roller and movable in unison with the substrate carrier for translation.

The second cleansing roller is located exactly under the first cleansing roller.

The rubbing device further comprises a vacuum cleaner. The vacuum cleaner is arranged in the channels.

The relative vertical distance between the lower surface of the aligning roller and the upper surface of the substrate that is to be subjected to alignment treatment is 0.1 to 0.6 mm.

The relative vertical distance between the lower surface of the aligning roller and the upper surface of the substrate that is to be subjected to alignment treatment is 0.2 to 0.5 mm.

The present invention further provides a rubbing method, which generally comprises:

(1) providing a rubbing device, which comprises: a substrate carrier for carrying a substrate that is to be subjected to alignment treatment, an aligning roller having a surface that is rubbing fabric, a driving mechanism for driving the substrate carrier and the substrate that is to be subjected to alignment treatment carried thereby to undergo a translational movement with respect to the aligning roller, an elevation arm for adjusting a relative vertical distance between a lower surface of the aligning roller and an upper surface of the substrate that is to be subjected to alignment treatment, channels formed in a top of the substrate carrier to correspond to two opposite side edges of the substrate that is to be subjected to alignment treatment in a translational movement direction, a vacuum cleaner arranged in the channels, a first cleansing roller, and a second cleansing roller;

(2) using the elevation arm to arrange the relative vertical distance between the lower surface of the aligning roller and the upper surface of the substrate that is to be subjected to alignment treatment so as to have the lower surface of the aligning roller suitable to contact and rub the upper surface of the substrate that is to be subjected to alignment treatment and to have the side edges of the upper surface of the substrate that is to be subjected to alignment treatment suitable to scrape the lower surface of the aligning roller;

(3) arranging the first cleansing roller to be movable in unison with the substrate carrier so as to have height of an upper surface of the first cleansing roller suitable to contact and rub the lower surface of the aligning roller and also to arrange the second cleansing roller to be suitable to contact and rub the first cleansing roller and be movable in unison with the substrate carrier;

(4) driving the substrate carrier and the substrate that is to be subjected to alignment treatment carried thereto to undergo translational movement with respect to the aligning roller;

(5) using the channels formed in the top of the substrate carrier to respectively correspond to the two opposite side edges of the substrate that is to be subjected to alignment treatment in the translational movement direction to collect PI (Polyimide) chips scraped off the lower surface of the aligning roller; and (6) using the vacuum cleaner to draw and move away the PI chips collected in the channels.

The rubbing method further comprises: (7) with the first cleansing roller that is arranged behind the substrate carrier in the translational movement direction thereof moved to a location under the aligning roller, using the first cleansing roller to cleanse the aligning roller.

The rubbing device of the present invention uses a substrate that is to be subjected to alignment treatment to scrape PI chips from an aligning roller that is in high speed rotation into channels so as to prevent the PI chips from moving with the aligning roller to spread over an AA zone of the substrate that is to be subjected to alignment treatment, thereby improving the defects of bright spots and mura generated in a rubbing process.

The rubbing method of the present invention uses a substrate that is to be subjected to alignment treatment to scrape PI chips from an aligning roller that is in high speed rotation into channels so as to prevent the PI chips from moving with the aligning roller to spread over an AA zone of the substrate that is to be subjected to alignment treatment, thereby improving the defects of bright spots and mura generated in a rubbing process.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

Figure 1:
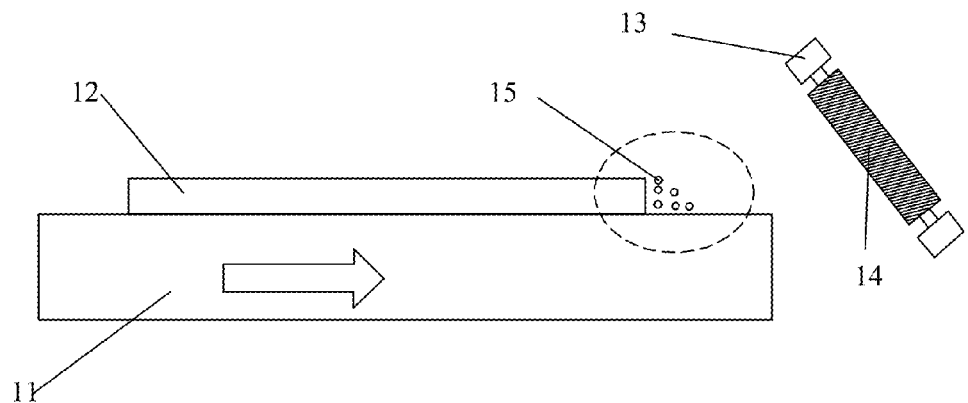
FIG. 1 is a schematic view illustrating the principle of generation of dust powders in a conventional rubbing process.
Figure 2:
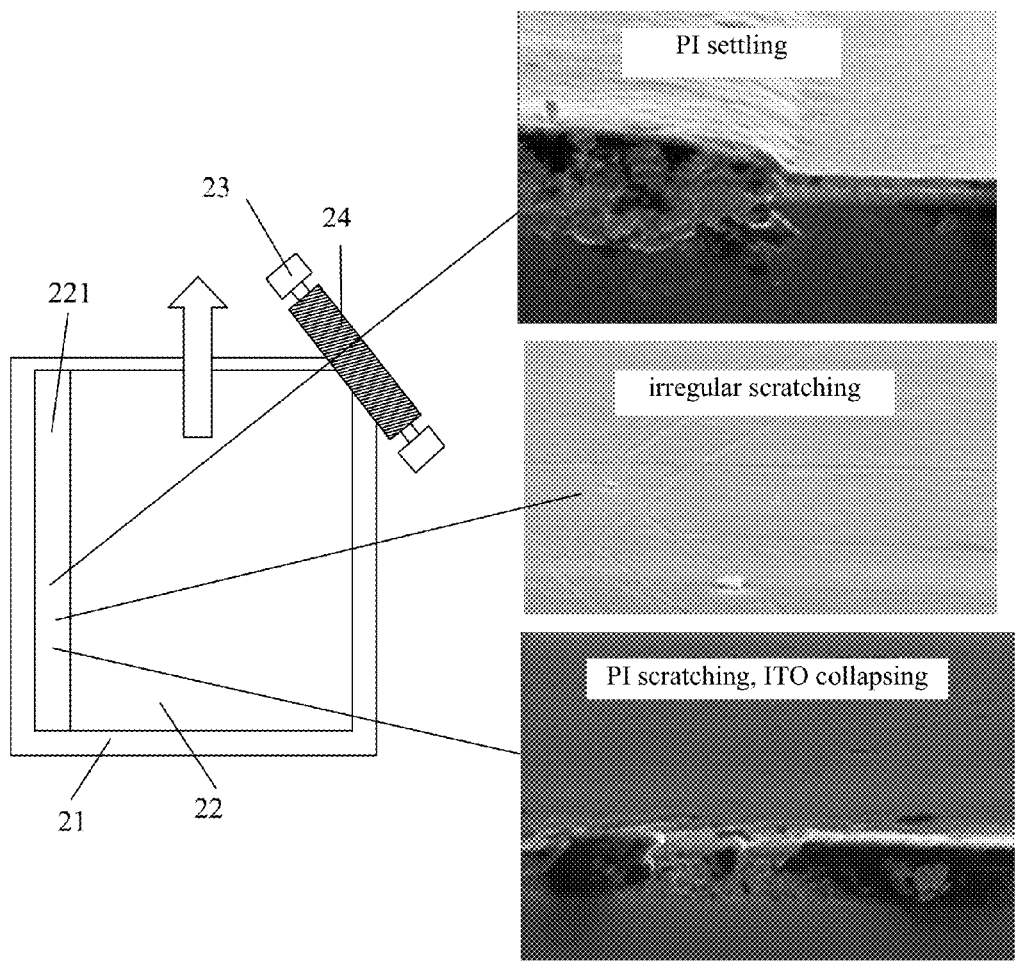
FIG. 2 shows scanning electron microscope photos of various types of defect generated in a conventional rubbing process.
Figure 3:
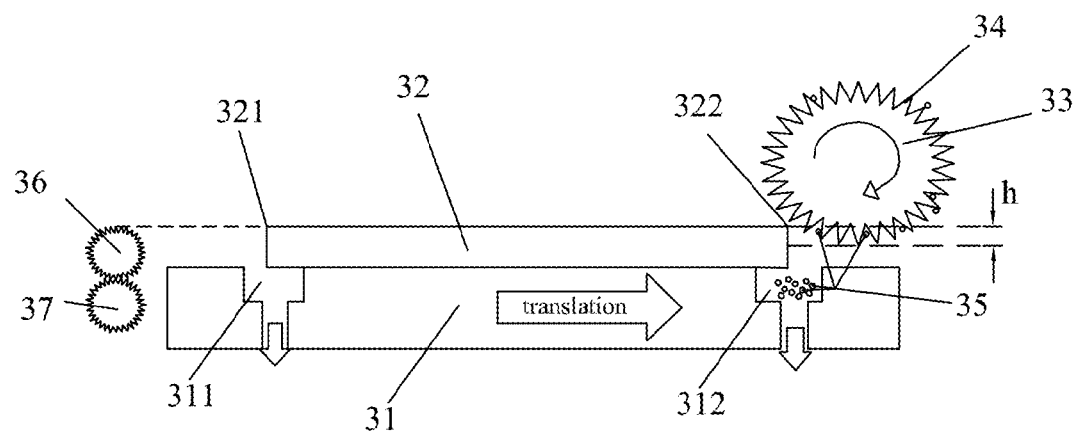
FIGS. 3 and 4 are schematic view showing a principle structure of a rubbing device according to a preferred embodiment of the present invention.
Figure 4:
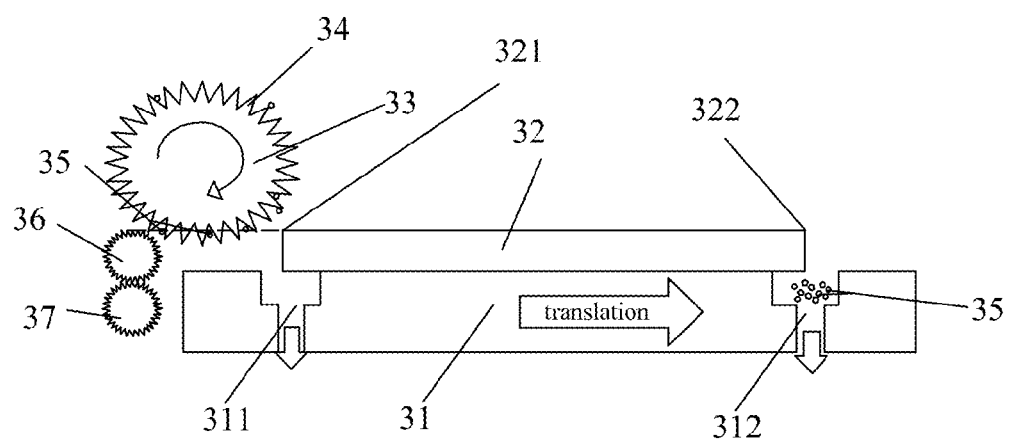

Referring to FIGS. 3 and 4, schematic views are given to show a principle structure of a rubbing device according to a preferred embodiment of the present invention. The rubbing device according to the present invention generally comprises: a substrate carrier 31 for carrying a substrate 32 that is to be subjected to alignment treatment, an aligning roller 33 having a surface that is rubbing fabric 34, a driving mechanism (not shown) for driving the substrate carrier 31 and the substrate 32 that is to be subjected to alignment treatment carried thereby to undergo a translational movement with respect to the aligning roller 33, and an elevation arm (not shown) for adjusting a relative vertical distance h between a lower surface of the aligning roller 33 and an upper surface of the substrate 32 that is to be subjected to alignment treatment. The relative vertical distance h is arranged to have the lower surface of the aligning roller 33 suitable to contact and rub the upper surface of the substrate 32 that is to be subjected to alignment treatment and also to have side edges 321 and 322 of the upper surface of the substrate 32 that is to be subjected to alignment treatment suitable to scrape the lower surface of the aligning roller 33. The substrate carrier 31 is provided in a top thereof with channels 311 and 312 corresponding to the two opposite side edges 321 and 322 of the substrate 32 that is to be subjected to alignment treatment in the translational movement direction. The channels 311 and 312 are arranged to be suitable to have the two side edges 321 and 322 of the substrate 32 that is to be subjected to alignment treatment respectively suspending in the channels 311 and 312.

FIGS. 3 and 4 show the aligning roller 33 rotates clockwise and the variation from FIG. 3 to FIG. 4 illustrates the translational movement of the substrate carrier 31, together with the substrate 32 that is to be subjected to alignment treatment carried thereby, in the direction indicated by the arrow. The substrate 32 that is to be subjected to alignment treatment must extend beyond inside edges of the channels 311 and 312 in order to make use of steps formed between the substrate 32 that is to be subjected to alignment treatment and the channels 311 and 312 to scrape PI chips 35 off the aligning roller 33. To prevent the cliff effect of a rubbing process, the present invention uses the substrate 32 that is to be subjected to alignment treatment to scrape the PI chips 35 from the aligning roller 33 that rotates at a high speed into the channel 311 or 312, thereby making the PI chips 35 accumulated in the channel 311 or 312 and not rebounded to the top of the substrate 32 that is to be subjected to alignment treatment so as to prevent the PI chips 35 from moving with the aligning roller 33 to spread over an AA zone of the substrate 32 that is to be subjected to alignment treatment.

The preferred embodiment further comprises a first cleansing roller 36. The first cleansing roller 36 is set behind the substrate carrier 31 in the translational movement direction of the substrate carrier 31 and is arranged to move in unison with the substrate carrier 31 for translation. The first cleansing roller 36 has an upper surface having a height that is suitable to contact and rub the lower surface of the aligning roller 33. For example, the upper surface of the first cleansing roller 36 can be set at a height that is substantially identical to the upper surface of the substrate 32 that is to be subjected to alignment treatment. With the translational movement of the substrate carrier 31, when the first cleansing roller 36 is moved to a location under the aligning roller 33, the aligning roller 33 and the first cleansing roller 36 are allowed to rub each other so as to cleanse off the PI chips 35 of the aligning roller 33. The preferred embodiment further comprises a second cleansing roller 37. The second cleansing roller 37 is arranged to contact and rub the first cleansing roller 36 and is movable in unison with the substrate carrier 31 for translation in order to cleanse the first cleansing roller 36. The second cleansing roller 37 can be arranged exactly under the first cleansing roller 36. Since both the first cleansing roller 36 and the second cleansing roller 37 are moved in unison with the substrate carrier 31, forward/backward movement of the substrate carrier 31 drives the first cleansing roller 36 and the second cleansing roller 37 to move forward/backward. It is appreciated that more cleansing rollers can be employed in the present invention.

The preferred embodiment further comprises a vacuum cleaner arranged in the channels 311 and 312. The vacuum cleaner arranged in the channels 311 and 312 can draw and move away the PI chips 35 to be discharged in the direction indicated by the arrow in order to prevent the PI chips 35 from getting filled and spilling.

In the preferred embodiment, the relative vertical distance h between the lower surface of the aligning roller 33 and the upper surface of the substrate 32 that is to be subjected to alignment treatment can be 0.1 to 0.6 mm; alternatively, the relative vertical distance h between the lower surface of the aligning roller 33 and the upper surface of the substrate 32 that is to be subjected to alignment treatment can be 0.2 to 0.5 mm. The relative vertical distance h is selected and set to have the lower surface of the aligning roller 33 suitable to contact and rub the upper surface of the substrate 32 that is to be subjected to alignment treatment at a proper alignment pressure and to have the side edges 321 and 322 of the upper surface of the substrate 32 that is to be subjected to alignment treatment suitable to scrape the lower surface of the aligning roller 33.

Although FIGS. 3 and 4 only give a drawing illustrating a principle structure of a rubbing device of a preferred embodiment of the present invention, this does not affect those having ordinary skills in the art to put the present invention into practice. In a practical application, the driving mechanism that drives the substrate carrier 31 and the substrate 32 that is to be subjected to alignment treatment carried thereby to undergo a translational movement with respect to the aligning roller 33 can be a slide rail. Since the first cleansing roller 36 and the second cleansing roller 37 are both movable in unison with the substrate carrier 31, the first cleansing roller 36 and the second cleansing roller 37 can be connected to the substrate carrier 31 or mounted to the slide rail. The slide rail can be mounted on a chassis and the aligning roller 33 is coupled to the chassis by the elevation arm so as to set the aligning roller 33 fixed and immobile in a horizontal direction, but allowed to move up and down by the elevation arm for adjustment of height thereof. The substrate 32 that is to be subjected to alignment treatment can be fixed to the substrate carrier 31 in various ways, such as by using a clamp or vacuum suction.

Figure 5:
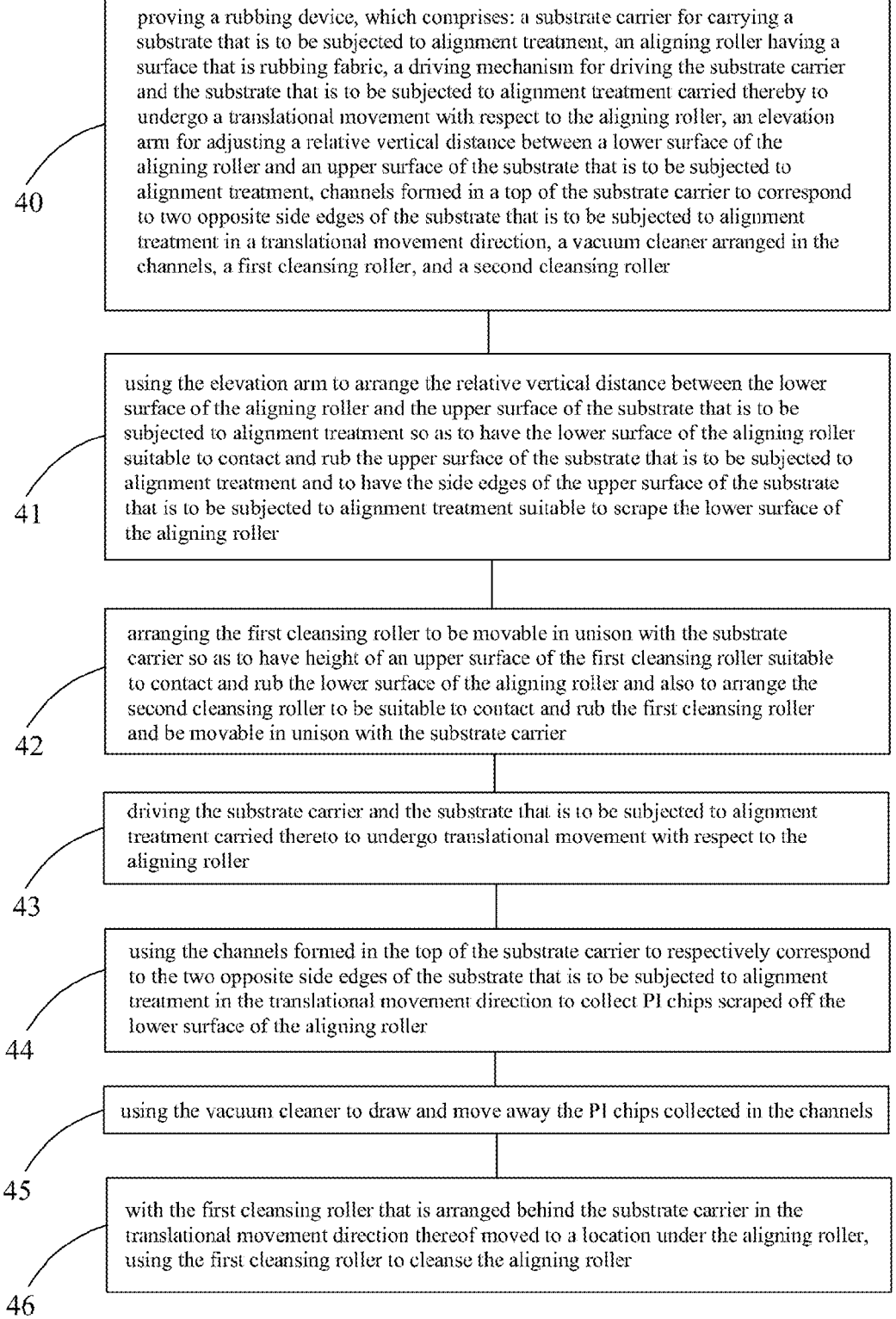
FIG. 5 is a flow chart illustrating a rubbing method according to a preferred embodiment of the present invention.

Referring to FIG. 5, which is a flow chart illustrating a rubbing method according to the present invention, according to the rubbing device provided by the present invention, the present invention provides a corresponding rubbing method, which generally comprises:

Step 40: providing a rubbing device, which comprises: a substrate carrier for carrying a substrate that is to be subjected to alignment treatment, an aligning roller having a surface that is rubbing fabric, a driving mechanism for driving the substrate carrier and the substrate that is to be subjected to alignment treatment carried thereby to undergo a translational movement with respect to the aligning roller, an elevation arm for adjusting a relative vertical distance between a lower surface of the aligning roller and an upper surface of the substrate that is to be subjected to alignment treatment, channels formed in a top of the substrate carrier to correspond to two opposite side edges of the substrate that is to be subjected to alignment treatment in a translational movement direction, a vacuum cleaner arranged in the channels, a first cleansing roller, and a second cleansing roller;

Step 41: using the elevation arm to arrange the relative vertical distance between the lower surface of the aligning roller and the upper surface of the substrate that is to be subjected to alignment treatment so as to have the lower surface of the aligning roller suitable to contact and rub the upper surface of the substrate that is to be subjected to alignment treatment and to have the side edges of the upper surface of the substrate that is to be subjected to alignment treatment suitable to scrape the lower surface of the aligning roller;

Step 42: arranging the first cleansing roller to be movable in unison with the substrate carrier so as to have height of an upper surface of the first cleansing roller suitable to contact and rub the lower surface of the aligning roller and also to arrange the second cleansing roller to be suitable to contact and rub the first cleansing roller and be movable in unison with the substrate carrier;

Step 43: driving the substrate carrier and the substrate that is to be subjected to alignment treatment carried thereto to undergo translational movement with respect to the aligning roller;

Step 44: using the channels formed in the top of the substrate carrier to respectively correspond to the two opposite side edges of the substrate that is to be subjected to alignment treatment in the translational movement direction to collect PI chips scraped off the lower surface of the aligning roller; and Step 45: using the vacuum cleaner to draw and move away the PI chips collected in the channels.

The rubbing method may further comprise: Step 46: with the first cleansing roller that is arranged behind the substrate carrier in the translational movement direction thereof moved to a location under the aligning roller, using the first cleansing roller to cleanse the aligning roller.

In summary, the present invention provides a rubbing device, which uses a substrate that is to be subjected to alignment treatment to scrape PI chips from an aligning roller that is in high speed rotation into channels so as to prevent the PI chips from moving with the aligning roller to spread over an AA zone of the substrate that is to be subjected to alignment treatment, thereby improving the defects of bright spots and mura generated in a rubbing process. The present invention provides a rubbing method, which uses a substrate that is to be subjected to alignment treatment to scrape PI chips from an aligning roller that is in high speed rotation into channels so as to prevent the PI chips from moving with the aligning roller to spread over an AA zone of the substrate that is to be subjected to alignment treatment, thereby improving the defects of bright spots and mura generated in a rubbing process.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A rubbing device, comprising: a substrate carrier for carrying a substrate that is to be subjected to alignment treatment, an aligning roller having a surface that is rubbing fabric, a driving mechanism that drives the substrate carrier and the substrate that is to be subjected to alignment treatment carried thereby to undergo a translational movement in a translation movement direction with respect to the aligning roller, and an elevation arm that adjusts a relative vertical distance between a lower surface of the aligning roller and an upper surface of the substrate that is to be subjected to alignment treatment, the relative vertical distance being arranged to have the lower surface of the aligning roller contact and rub the upper surface of the substrate that is to be subjected to alignment treatment and also to have side edges of the upper surface of the substrate that is to be subjected to alignment treatment scrape the lower surface of the aligning roller, the substrate carrier being provided in a top thereof with channels corresponding to two opposite side edges of the substrate that is to be subjected to alignment treatment in the translational movement direction, the channels being arranged to have the two side edges of the substrate that is to be subjected to alignment treatment respectively suspending in the channels.

2. The rubbing device as claimed in claim 1 further comprising a first cleansing roller, the first cleansing roller being set behind the substrate carrier in the translational movement direction of the substrate carrier and arranged to move in unison with the substrate carrier for translation, the first cleansing roller having an upper surface having a height that is suitable to contact and rub the lower surface of the aligning roller.

3. The rubbing device as claimed in claim 2 further comprising a second cleansing roller, the second cleansing roller being arranged to contact and rub the first cleansing roller and movable in unison with the substrate carrier for translation.

4. The rubbing device as claimed in claim 3, wherein the second cleansing roller is located exactly under the first cleansing roller.

5. The rubbing device as claimed in claim 1 further comprising a vacuum cleaner, the vacuum cleaner being arranged in the channels.

6. The rubbing device as claimed in claim 1, wherein the relative vertical distance between the lower surface of the aligning roller and the upper surface of the substrate that is to be subjected to alignment treatment is 0.1 to 0.6 mm.

7. The rubbing device as claimed in claim 6, wherein the relative vertical distance between the lower surface of the aligning roller and the upper surface of the substrate that is to be subjected to alignment treatment is 0.2 to 0.5 mm.

8. A rubbing device, comprising: a substrate carrier for carrying a substrate that is to be subjected to alignment treatment, an aligning roller having a surface that is rubbing fabric, a driving mechanism that drives the substrate carrier and the substrate that is to be subjected to alignment treatment carried thereby to undergo a translational movement in a translation movement direction with respect to the aligning roller, and an elevation arm that adjusts a relative vertical distance between a lower surface of the aligning roller and an upper surface of the substrate that is to be subjected to alignment treatment, the relative vertical distance being arranged to have the lower surface of the aligning roller contact and rub the upper surface of the substrate that is to be subjected to alignment treatment and also to have side edges of the upper surface of the substrate that is to be subjected to alignment treatment scrape the lower surface of the aligning roller, the substrate carrier being provided in a top thereof with channels corresponding to two opposite side edges of the substrate that is to be subjected to alignment treatment in the translational movement direction, the channels being arranged to have the two side edges of the substrate that is to be subjected to alignment treatment respectively suspending in the channels;
further comprising a first cleansing roller, the first cleansing roller being set behind the substrate carrier in the translational movement direction of the substrate carrier and arranged to move in unison with the substrate carrier for translation, the first cleansing roller having an upper surface having a height that is suitable to contact and rub the lower surface of the aligning roller; and
further comprising a second cleansing roller, the second cleansing roller being arranged to contact and rub the first cleansing roller and movable in unison with the substrate carrier for translation.

9. The rubbing device as claimed in claim 8, wherein the second cleansing roller is located exactly under the first cleansing roller.

10. The rubbing device as claimed in claim 8 further comprising a vacuum cleaner, the vacuum cleaner being arranged in the channels.

11. The rubbing device as claimed in claim 8, wherein the relative vertical distance between the lower surface of the aligning roller and the upper surface of the substrate that is to be subjected to alignment treatment is 0.1 to 0.6 mm.

12. The rubbing device as claimed in claim 11, wherein the relative vertical distance between the lower surface of the aligning roller and the upper surface of the substrate that is to be subjected to alignment treatment is 0.2 to 0.5 mm.

13. A rubbing method, comprising:
(1) providing a rubbing device, which comprises: a substrate carrier for carrying a substrate that is to be subjected to alignment treatment, an aligning roller having a surface that is rubbing fabric, a driving mechanism for driving the substrate carrier and the substrate that is to be subjected to alignment treatment carried thereby to undergo a translational movement with respect to the aligning roller, an elevation arm for adjusting a relative vertical distance between a lower surface of the aligning roller and an upper surface of the substrate that is to be subjected to alignment treatment, channels formed in a top of the substrate carrier to correspond to two opposite side edges of the substrate that is to be subjected to alignment treatment in a translational movement direction, a vacuum cleaner arranged in the channels, a first cleansing roller, and a second cleansing roller;
(2) using the elevation arm to arrange the relative vertical distance between the lower surface of the aligning roller and the upper surface of the substrate that is to be subjected to alignment treatment so as to have the lower surface of the aligning roller suitable to contact and rub the upper surface of the substrate that is to be subjected to alignment treatment and to have the side edges of the upper surface of the substrate that is to be subjected to alignment treatment suitable to scrape the lower surface of the aligning roller;
(3) arranging the first cleansing roller to be movable in unison with the substrate carrier so as to have height of an upper surface of the first cleansing roller suitable to contact and rub the lower surface of the aligning roller and also to arrange the second cleansing roller to be suitable to contact and rub the first cleansing roller and be movable in unison with the substrate carrier;
(4) driving the substrate carrier and the substrate that is to be subjected to alignment treatment carried thereto to undergo translational movement with respect to the aligning roller;
(5) using the channels formed in the top of the substrate carrier to respectively correspond to the two opposite side edges of the substrate that is to be subjected to alignment treatment in the translational movement direction to collect PI (Polyimide) chips scraped off the lower surface of the aligning roller; and
(6) using the vacuum cleaner to draw and move away the PI chips collected in the channels.

14. The rubbing method as claimed in claim 13 further comprising:
(7) with the first cleansing roller that is arranged behind the substrate carrier in the translational movement direction thereof moved to a location under the aligning roller, using the first cleansing roller to cleanse the aligning roller.

* * * * *